Nov. 14, 1950         M. L. SANDS         2,529,666
PULSE HEIGHT ANALYZER

Filed July 19, 1948                                            2 Sheets—Sheet 1

WITNESSES
Gene C. Newlin
Louis J. Jacot

INVENTOR.
Matthew L. Sands
BY
Roland A. Anderson

Patented Nov. 14, 1950

2,529,666

UNITED STATES PATENT OFFICE 2,529,666

PULSE HEIGHT ANALYZER

Matthew L. Sands, Everett, Mass., assignor to the United States of America as represented by the United States Atomic Energy Commission Application July 19, 1948, Serial No. 39,539

4 Claims. (Cl. 250—27)

This invention relates to electronic computing circuits and more particularly to plural channel counting circuits.

One form of plural channel counting circuit which has become increasingly important in carrying out studies of nuclear reactions is adapted to analyze and sensibly indicate the pulse height, i. e. voltage amplitude distribution of large numbers of randomly occurring pulses. These pulses may be generated by ionizing events as indicated by the emergence from the reaction zone of charged particles, and detected by equipment well-known in the art and not forming part of the present invention. Pulse height analyzers of this type generally include a plurality of discriminating circuits for example, electron discharge devices or tubes biased to be responsive only to pulses of predetermined voltage levels and circuits to record the acceptance of a pulse by each of said discriminators. See Freundlich et al., Review of Scientific Inst., vol. 18, No. 2, page 90 (February 1947).

While such circuits decreased the time required to conduct certain types of investigations by older methods (i. e. single channel discriminating and recording systems) certain undesirable characteristics are evident. For example, the attempt is made in such circuits to analyze and record incoming pulses as the pulse reaches its maximum. When the pulse clearly belongs in a particular channel and its maximum is approximately midway between the lower and upper voltage values which define the channel, no difficulty is encountered. On the other hand, when the maximum value of the pulse is close to the boundary between two channels, the systems heretofore constructed have been unable to determine which channel is the proper one to record the occurrence of the pulse. This indecision, as it were, results from the inherent nature of the electronic circuits involved and furthermore may result from the influence exerted back on the discriminating circuit by the recording circuit. It is further apparent, that such circuits and systems are characterized by a "dead" or non-responsive time, dependent upon the decay time of the incoming pulse which is a function of the pulse height. Inasmuch as the pulse heights of the input pulses vary through wide limits, the dead time of the system varies as well thus imparting a certain amount of uncertainty to the recorded results.

It is thus seen to be a primary object of the present invention to provide an improved plural channel electronic analyzing system for recording pulses of predetermined character and having a rate of occurrence up to about 12,000 pulses per minute.

A more specific object of the present invention is to provide such an analyzing system in which the plurality of channels are successively contiguous and non-overlapping.

A further object of the present invention is to provide in plural channel systems of the type described, improved discriminating mixing and recording circuits which prevent the analysis and/or recording of an input pulse from influencing the characteristics of the said pulse.

Still another object of the present invention is to provide a plural channel analyzing and recording system in which a number of characteristics of the input pulses may be recorded simultaneously.

Other objects and advantages will be apparent from the following explanation and the description of a presently preferred embodiment which is given for illustrative purposes only.

The above objects are attained by providing, in combination with a system including a plurality of counting channels, discriminating circuits in each of said channels adapted to be triggered and maintained in triggered condition upon the acceptance of an input pulse of predetermined characteristic and means for indicating the particular channel defining said characteristic, said means being operable in response to a registering signal fed to the system after the substantially complete decay of the input pulse.

In order to describe the present invention further and increase the understanding thereof, reference is made to the drawings, made part of this specification, in which.

Figure 1:
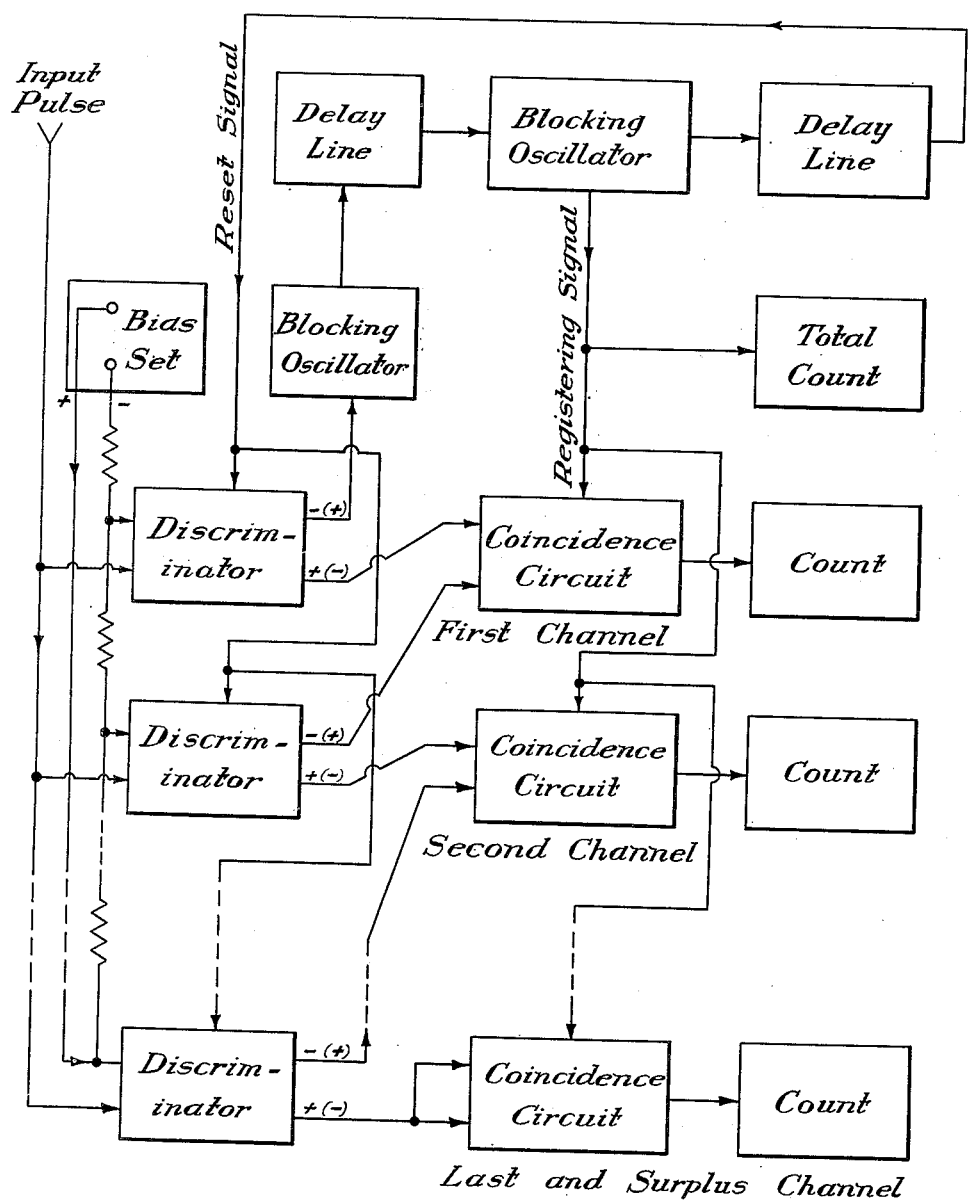
Figure 1 is a block diagram representation of a pulse height analyzing system embodying the principles of the present invention.

Referring to Figure 1 of the attached drawings, input pulses are impressed simultaneously on each of a number of lock-in discriminators whose biases increase progressively from the first discriminator to the surplus channel as schematically indicated by the series resistors associated with the block labelled bias set. Each discriminator has two output leads having steady voltages whose relative polarities are indicated by plus and minus signs. If a particular discriminator is triggered into its alternate state, as explained later, it will remain there for some time. The output voltages then have relative polarities indicated by the plus and minus signs in parenthesis. When the discriminator of the first channel is triggered, a positive pulse is supplied to a sequence of blocking oscillators and delay lines which generate the registering and reset pulses. The delay intervals are such that before the registering and reset pulses appear, the input pulse must have risen to its maximum amplitude thereby triggering all discriminators biased to be responsive to the peak amplitude, and then decayed substantially to zero. The coincidence circuits in the highest channel reached by the input pulse thus has two negative input signals applied to it, and all others have both positive and negative input signals applied to them. When the registering pulse from the pulse forming channel occurs, a count is recorded only in that one channel which differs from the others in that the coincidence circuit has two negative input signals applied to it. Soon after, the reset pulse restores all discriminators returning the entire system to its original condition except for the count registered in one of the channels.

Any input pulse of amplitude too small to trigger the first discriminator passes all of the channels unnoticed, and when the input pulse is large enough to trigger the last discriminator, it is recorded in the surplus channel. The total number of pulses entering with sufficient amplitude to trigger the discriminator in the first channel and so to trigger the first blocking oscillator, are recorded by counting the number of registering pulses in the portion of the system labelled "total count."

Figure 2:
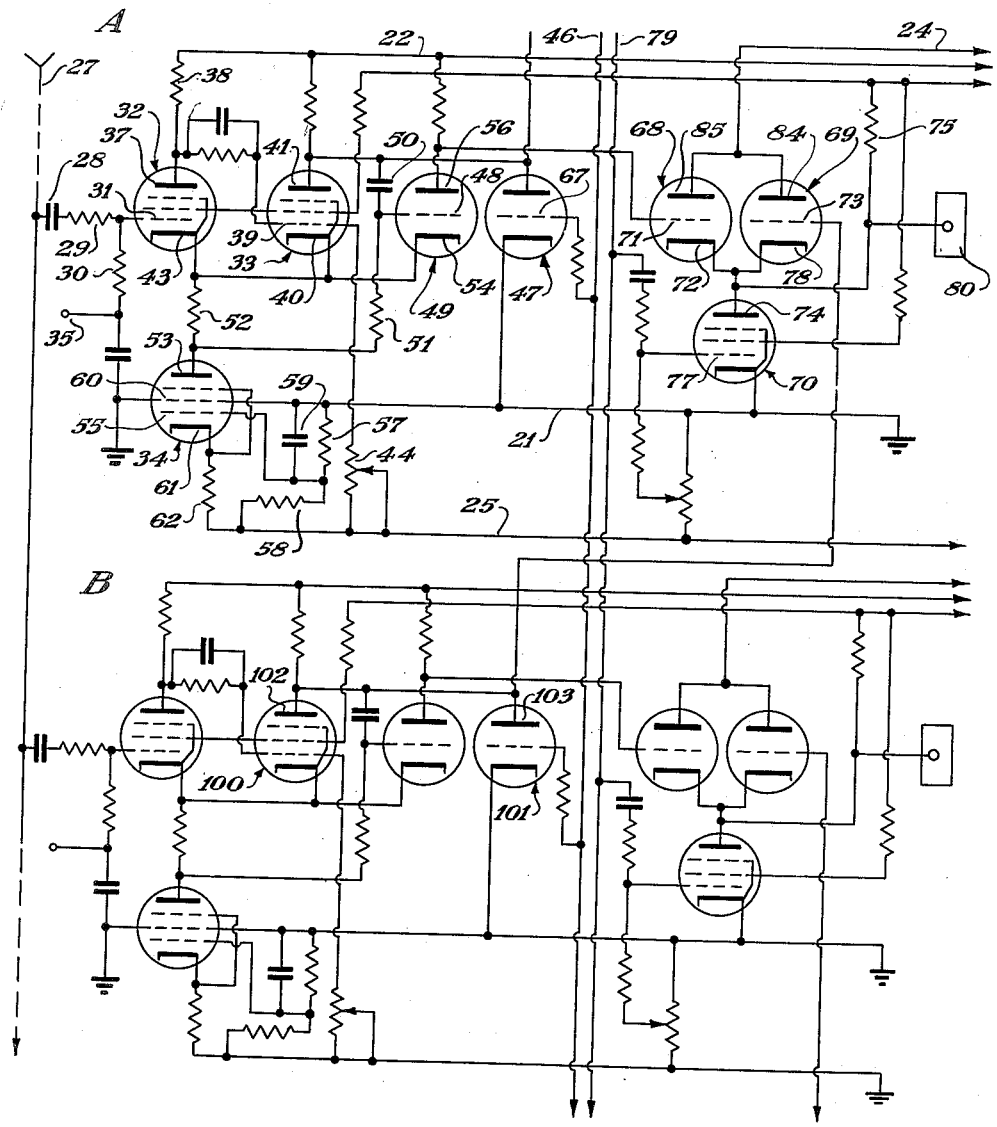
Figure 2 shows a schematic circuit diagram of two of the channels of the system of Figure 1.

For a more detailed description of the operation of the circuit, reference is made to Figure 2 which is a schematic diagram showing channels A and B of a number of identical channels, for example ten. The operation of these two channels will be described in detail, and the operation of the remaining channels will then be clear, since variation of their operation is only in their successively increased discriminating levels. The last or surplus channel is connected in such a manner that it will record all pulses triggering its discriminator, and occurring in conjunction with a registering signal, and is essentially identical with the preceding channels. Pulses to be analyzed are applied to input conductor 27 where they are fed simultaneously to the R. C. input network of the discriminator section of all channels. The input network of channel A, composed of a condenser 28 and resistors 29 and 30, applies the input pulse to grid 31 of tube 32. Tubes 32 and 33 are connected in a modification of the Schmitt-trigger-circuit with two stable states. Tube 34 and its associated components constitute a constant current device which performs the general function of a common cathode resistor. Terminal 35 associated with grid 31 is returned to a suitable supply of bias voltage whose value can be supplied in predetermined steps for all discriminators.

The discriminator used in the present system, known as an amplitude discriminator, discriminates between pulses which differ in amplitude as little as a small fraction of a volt. Grid 31 of tube 32 is held at a predetermined level by the bias supply indicated at 35 through resistor 30. Under these conditions, tube 32 is cutoff and anode 37 through load resistor 38 rests essentially at the positive potential of supply line 22. With grid 31 at a negative potential, nothing happens until a positive pulse large enough to start tube 32 conducting appears at the input. (The setting of resistor 44 determines the critical potential at grid 31 at which tube 32 starts conducting.) At this time, tube 32 begins to conduct lowering the potential of anode 37 therefore producing a negative signal. This negative signal is fed through an R. C. network to grid 39 of tube 33. A regenerative condition occurs when the negative signal on anode 37 drives grid 39 of tube 33 negatively which, in normal operation of the Schmitt-trigger-circuit, would cause a sudden transfer of current from tube 33 to tube 32. Likewise, in the new state, tube 32 would continue to conduct and cathodes 40 and 43 would rise with the grid 31 in a manner similar to a cathode follower and therefore prevent the grid from drawing current. Furthermore, anode 37 of tube 32 would be below the positive potential of supply line 22 and grid 39 would be below cutoff. When grid 39 of tube 33 is driven negative, a positive pulse appears at anode 41. Without the lock-in device of this invention, when grid 31 of tube 32 decreased from values above the triggering potential, return to the initial state would occur at some value slightly below that at which the initial triggering took place. However, this return to the initial state does not occur because of the lock-in device described below.

Grid 48 of tube 49 is connected to anode 41 of tube 33 through condenser 50, so that when the discriminator is triggered and anode 41 rises grid 48 rises also. This causes tube 49 to conduct raising its cathode 54, as well as cathodes 40 and 43. This increase in the cathode potential of tube 33 prevents the return of said tube to the conducting state which would normally occur upon the decay of the input signal. Since tube 33 remains non-conducting, grid 48 is maintained at a positive potential and tube 49 continues to conduct.

Thus, a new stable state of the circuit is introduced independent of the return of the input pulse to its starting value. In essence, the function of this "locked-in" state is as a memorizing state and the function of tube 49 is to introduce a memory circuit to cooperate with the discriminating circuit including tubes 32 and 33. The duration of the memorizing state depends solely upon the values of the coupling elements associated with grid 48 of tube 49 and in the embodiment shown depends upon the values of condenser 50 and resistor 51. Obviously, capacity coupling (i. e. by the employment of a condenser such as condenser 50) is not essential and an infinitely long memorizing time may be effected by the employment of pure resistance coupling. As a further alternative, and in the present embodiment, the duration of the memorizing state is determined by the occurrence of an independent resetting signal which takes place at a fixed time after the input pulse is fed to the system, as will be explained in greater detail below.

It should be noted at this point that the introduction of the memorizing states does not interfere with the operation of tube 32 as a cathode follower on large signals, as was described in connection with the usual mode of operation of the modified Schmitt-trigger-circuit here employed. It is thus seen to be desirable to employ as well a constant current device as the common cathode return resistor.

Tube 34, which acts as such a constant current device, has its anode 53, through load resistor 52, connected to the cathodes 43, 40 and 54 of tubes 32, 33 and 49 respectively. Grid 55 of tube 34 is held at a negative potential by the voltage divider consisting of resistors 57 and 58 connected between ground 21 and negative potential 25 and is stabilized for fast voltage changes by condenser 59, tending to maintain the cathode current constant. Screen grid 60 is connected to ground 21. Cathode 61 is connected through resistor 62 to a conductor 25 having a negative potential impressed thereon to provide degeneration of the tube 34, which further tends to stabilize the total current flowing through the tube.

In order to accomplish a memory time (above described) which is the same for all channels and all input pulses, a resetting action is effected by the use of tube 47. A positive resetting signal which is derived from the input pulse is impressed from a source not shown, through conductor 46 after a suitable delay on grid 67. This signal causes tube 47 to conduct, thus impressing a negative signal on grid 48 of tube 49, cutting off tube 49 and lowering the cathode potential of tube 33 permitting it to conduct and the discriminator circuit to return to its initial stable state. The entire system is immediately ready to accept the next input pulse. This reset signal, as is evident in the drawing, is applied simultaneously to each channel through said conductor 46.

It will be noticed that in an untriggered state, the potential of anode 56 of tube 49 rests at the value of supply line 22, and the anode 41 of tube 33 rests at a somewhat lower potential, whereas after a discriminator has been triggered and locked-in as above described, the potential of anode 41 is that of supply line 22 and anode 56 of tube 49 is at a lower potential. This change of potential levels and the corresponding change at corresponding points in adjacent channels are utilized in the operation of a coincidence circuit to indicate the particular channel in which the input pulse is to be counted.

One type of such a coincidence circuit is formed by the combination of tubes 68, 69 and 70. Grid 71 of tube 68 is directly connected to the anode of tube 49. Grid 73 of tube 69 is directly connected to anodes 102 and 103 of tubes 100 and 101 respectively of the next higher channel generically indicated by reference letter B. Anodes 84 and 85 are connected by supply line 24 to a source of anode potential higher than that supplied through supply line 22 while cathodes 72 and 78 are connected together and to the anode 74 of tube 70.

At a time after the input pulse has decayed to its initial level, but before the resetting signal occurs, a positive registering signal of short duration is applied (from a source not shown but hereinafter described) through conductor 79 to control grid 77 of tube 70 and simultaneously to all the corresponding tubes of the other channels.

Now, in the event that neither of the discriminators of two adjacent channels (e. g. A and B in Figure 2) has been triggered, the grid of tube 68 is found at the potential of supply line 22. The current which flows in the anode circuit of tube 70 in response to the registering signal passes through tube 68 resulting in no substantial change in the potential of cathodes 72 and 78 and hence no operating signal is transmitted to the associated counting device 80 of channel A.

If, alternatively, channel A is triggered by an input pulse and channel B is not triggered by the same pulse, grid 71 as well as grid 73 are at potentials substantially below that of line 22. The current which flows in the anode circuit of tube 70 in response to the registering signal must now flow through resistor 75 producing an operating signal at the input terminal of counting device 80 and the input pulse is counted as falling within the voltage limits defining channel A.

As a last alternative, if the discriminators of both channels A and B are triggered by the input pulse, grid 71 of tube 68 is at a potential below that of line 22, but grid 73 of tube 69 is now at the potential of line 22 (i. e. the corresponding supply for channel B) due to the previously described action of the locked-in discriminator of channel B. The current which flows in the anode circuit of tube 70 in response to the registering signal now flows through tube 69 resulting in no substantial change in the potential of cathodes 72 and 78 and thus again no operating signal is transmitted to counting device 80 of channel A.

It is apparent that any suitable three-fold coincidence circuit may be employed for the purposes described, however, the particular circuit shown has been found desirable inasmuch as it is possible to drive a diode coupled binary scaler directly from it without the interposition of auxiliary coupling devices. A further description of the operation of the said coincidence circuit in driving such a scaler is found in the copending U. S. Patent application of the present inventor Serial No. 606,406, filed July 21, 1945.

The registering and resetting signals above mentioned are derived from the input pulse and provided in the following manner. When the input pulse is large enough to trigger the lowest biased discriminator (i. e. the first channel), and assuming channel A to be the first channel, the pulse is accompanied by a rising potential at anode 41 of tube 33 which in turn and through a suitable conductor as conductor 45 is made to trigger a pulse generating device (e. g. a blocking oscillator as indicated in Figure 1). The output signal of the pulse generating device is delayed by a predetermined amount, in the present embodiment five microseconds, and employed to produce a positive pulse of short duration as a registering signal. In a similar manner, a further delay signal (e. g. 0.5 microsecond) is produced and provided as a reset signal to all channels as above described. The magnitude of the delays between the occurrence of the input pulse and the registering signal and between the latter and the reset signal are chosen to suit the particular nature of the input pulses and the counting rates encountered under the conditions of employment of the signal.

It is a feature of the present invention that it is not essential that the registering or resetting signal be derived directly from the input pulse, but preferably that they only bear a predetermined time relationship therewith. Thus, it is possible to introduce into the system further restrictive requirements in the observation of any particular input pulse. For example, only such events occurring with certain directional characteristics may be employed to produce the registering and resetting signals.

As noted hereinabove in the embodiment described, but in no wise a modification of the principles of the invention, an additional counter was provided (see Figure 1) for counting all registering signals. This counter was associated, as shown, with the first channel. Furthermore, a channel designated as the surplus channel in Figure 1 was provided to count all input pulses which were so high as to trigger all of the discriminating channels. This latter function is achieved by means of a two-fold coincidence circuit responsive to the registering signal and the signal from the discriminator having the highest bias setting.

It will thus be seen that there has been described a presently preferred embodiment of an electronic system for affecting plural channel analysis of random pulses. The said system is characterized by its ability to record a pulse in its proper channel after the pulse has decayed substantially to its initial or zero value. The provision of discriminator circuits which are adapted to be locked in a trigger or "pulse accepting" state effectively prevents the recording action of the system from affecting the maximum amplitude of the pulse and therethrough the channel in which the pulse is recorded.

Obviously, many variations in the circuit components employed and the manner of associating the same will suggest themselves to one skilled in the art without departing from the spirit and scope of the present invention.

As has been indicated, any type of three-fold coincidence circuit may be employed in the registering portion of the system. Likewise, modifications in the discriminators described may be deemed desirable for particular applications. The inclusion of circuit components and/or elements for the elimination of parasitics has not been discussed in connection with the embodiment described, as these and other refinements well-known to those skilled in the art are deemed to be obvious. It will therefore be seen that no limitations should be placed on the scope of the present invention except as such limitations are defined in the appended claims.

What is claimed is:

1. An impulse discriminating and counting system comprising a plurality of electronic channels, a flip-flop circuit in each of said channels, means for biassing the flip-flop circuits in each channel with a selected value of potential different than the value of potential in the other channels, means connected to each flip-flop circuit to lock it in its unstable state for a selected interval; a coincidence circuit, and registering means connected to said coincidence circuit, means for impressing a pulse to be registered on the coincidence circuit within said selected interval, means electrically coupling the coincidence circuit to the respective channel flip-flop circuit to activate it, and means electrically coupling the coincidence circuit to the flip-flop circuit of the channel having the next higher bias, whereby the coincidence circuit permits its respective channel to register a pulse having an amplitude corresponding to the selected bias of the respective channel, and not to register a pulse having an amplitude acceptable to a channel having a higher bias.

2. In an impulse counting system a plurality of channels, each channel having a flip-flop trigger circuit, means for impressing a selected bias on each flip-flop circuit whereby it is subject to shift into an unstable condition of balance in response to an input pulse of selected magnitude, means including an electronic tube electrically connected to the trigger circuit to maintain the second condition of balance for a selected interval, a pulse counting device, a normally open coincidence circuit connected to the pulse counting device, a source of registering pulses; means for impressing the registering pulses on the electronic coincidence circuit during said selected interval, means coupling the coincidence circuit to the trigger circuit, whereby it is activated during said selected interval so that said registering pulse is impressed on the pulse counting device, and whereby in the absence of operation of said flip-flop circuit the registering pulse is not impressed on the counting device.

3. A system for segregating and recording pulses of selected amplitudes originating from a source of pulses of different amplitudes, comprising a plurality of channels, each of said channels comprising an input flip-flop trigger circuit biassed at a selected level whereby impulses having an amplitude above the selected bias level activate the trigger circuit, a lock-in circuit connected to the trigger circuit and having a selected time constant for locking the trigger circuit in its activated state for a selected duration, a coincidence circuit comprising a first, a second and a third grid controlled thermionic tube, said first and second thermionic tubes being normally conductive and non-conductive respectively and being connected with their interelectrode spaces in parallel and said third thermionic tube having a cathode, grid and anode and being connected with its cathode-anode interelectrode space in series with the interelectrode spaces of the first and second thermionic tubes and a source of anode potential, an impedance connected between the anode of the third thermionic tube and a second source of anode potential and a counting device being coupled to the junction of the third thermionic tube and said impedance, means for impressing a registering pulse on the grid of the third thermionic tube, and means for coupling the first thermionic tube to the lock-in circuit whereby it is open circuited during the lock-in state, and means coupling the grid of the second thermionic tube to the trigger circuit of another channel whereby activation of the said other channel short circuits the second thermionic tube whereby a pulse appearing at the anode of the third thermionic tube is registered when the respective channel only is activated.

4. A system for segregating and recording pulses of selected amplitudes originating from a source of pulses of different amplitudes, comprising a plurality of channels, each of said channels comprising an input flip-flop trigger circuit biassed at a selected level whereby impulses having an amplitude above the selected bias level activate the trigger circuit, a lock-in circuit connected to the trigger circuit and having a selected time constant for locking the trigger circuit in its activated state for a selected duration, a coincidence circuit comprising a first, a second and a third grid controlled thermionic tube, said first and second thermionic tubes being normally conductive and non-conductive respectively and being connected with their interelectrode spaces in parallel and said third thermionic tube having a cathode, grid and anode and being connected with its cathode-anode interelectrode space in series with the interelectrode spaces of the first and second thermionic tubes and a source of anode potential, an impedance connected between the anode of the third thermionic tube and a second source of anode potential and a counting device being coupled to the junction of the third thermionic tube and said impedance, means for impressing a registering pulse on the grid of the third thermionic tube, and means for coupling the first thermionic tube to the lock-in circuit whereby it is open circuited during the lock-in state, and means coupling the grid of the second thermionic tube to the trigger circuit of another channel whereby activation of the said other channel short circuits the second thermionic tube whereby a pulse appearing at the anode of the third thermionic tube is registered when the respective channel only is activated; means for impressing a resetting pulse subsequent in time to the occurrence of the registering pulse on the lock-in circuit to deactivate it and thereby permit the flip-flop circuit to resume its equilibrium state.

MATTHEW L. SANDS.

REFERENCES CITED

The following references are of record in the file of this patent:

UNITED STATES PATENTS

| Number | Name | Date |
|---|---|---|
| 2,272,070 | Reeves | Feb. 3, 1942 |
| 2,430,725 | Miller et al. | Nov. 11, 1947 |
| 2,448,814 | Mann et al. | Sept. 7, 1948 |

OTHER REFERENCES

Review of Scientific Instruments, February 1941, pp. 102, 103, "A Circuit for Firing Thyratrons in Timed Sequence," by Loeffel.